D. BROY.
Hand Corn Planter.
No. 76,709. Patented April 14, 1868.
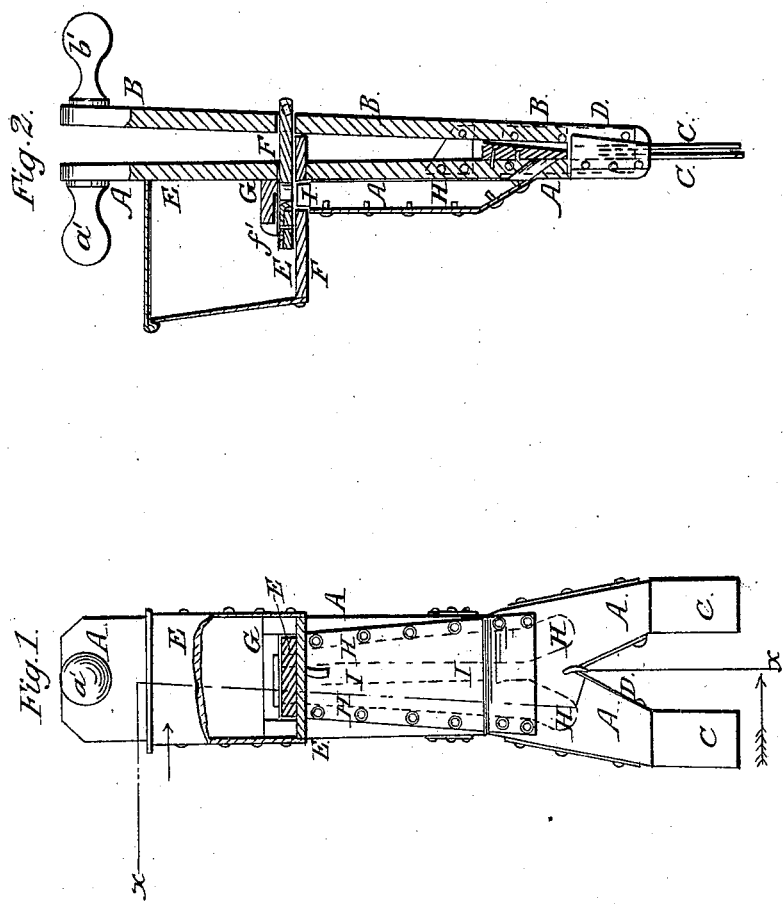
WITNESSES.
Theo Fusche.
Wm Trewin
INVENTOR.
Dan'l. Broy.
per Munn & Co.
Attorney.

United States Patent Office.

DANIEL BROY, OF CANTON, MISSOURI.

Letters Patent No. 76,709, dated April 14, 1868.

IMPROVEMENT IN HAND CORN-PLANTERS.

The Schedule referred to in these Letters Patent and making part of the same.

TO ALL WHOM IT MAY CONCERN:

Be it known that I, DANIEL BROY, of Canton, in the county of Lewis, and State of Missouri, have invented a new and useful Improvement in Hand Corn-Planters; and I do hereby declare that the following is a full, clear, and exact description thereof, which will enable others skilled in the art to make and use the same, reference being had to the accompanying drawings forming part of this specification, in which—

Figure 1 is a rear view of my improved corn-planter, part being broken away to show the construction.

Figure 2 is a detail sectional view of the same, taken through the line $x$ $x$, fig. 1.

Similar letters of reference indicate corresponding parts.

My invention has for its object to furnish an improved corn-planter, so constructed and arranged that the seed may be divided or scattered when dropped, and which shall, at the same time, be simple in construction, and convenient and effective in operation; and it consists in the construction, combination, and arrangement of the parts, by means of which the division or scattering of the seed is effected.

A and B are two wooden boards or bars, hinged to each other a little above their lower ends, as shown in figs. 1 and 2. To the outer sides of the upper ends of the bars or boards A and B are attached the handles $a'$ and $b'$, by which the machine is operated. The lower ends of the bars or boards A and B are forked, as shown in fig. 1, and to the inner sides of the branches thus formed are attached plates, C, by which holes in the ground are opened, and between which the seed passes to the ground.

D is an angular plate, secured to one of the plates, as A, in the angle between the branches, at its lower end, and overlapping the edges of the angle between the branches of the other bar or board, B, to prevent the seed from escaping between the said branches, and compel it to pass down between the plates C. E is the seed-box, in the bottom of which is placed a slide, F, the end of which passes through the front of the box E, through the bar or board A, and is pivoted or otherwise secured to the other bar, B, as shown in fig. 2.

Through the slide F is formed a hole, of sufficient size to contain enough seed to plant a hill. This hole may be adjusted according to the amount of seed to be deposited in each hill, by means of the adjustable plate $f'$, as shown in fig. 2.

G is a cap or block placed over the discharging-orifice of the seed-box, and through which the slide F moves back and forth. The block or cap G is notched directly over the holes or valves in the slide F, so that it may act as a scraper or cut-off, to prevent too much seed from escaping when the discharge-orifice is uncovered, and to do this without bruising or injuring the seed.

H are spouts or channels leading from the discharge-orifice of the seed-box to orifices in the board or bar A, at or near the branched lower end of said bar, as shown in figs. 1 and 2.

The upper edge of the partition I, that separates the channels from each other, is made sharp or wedge-shaped, so as to divide or separate the seed as it drops from the discharge-orifice of the seed-box, causing part to pass down each channel. This scattering the seed in the hill enables the plants to be thinned, when necessary, more conveniently, and without disturbing or injuring the remaining plants, and at the same time allows the plants to develope without obstructing each other.

I claim as new, and desire to secure by Letters Patent—

1. The combination and arrangement of the forked bars or boards A and B, plates C and D, channels H, slide F, cap or block G, and seed-box E, with each other, substantially as herein shown and described, and for the purpose set forth.

2. Forming the upper edge of the partition I, that separates the channels H from each other, sharp or wedge-shaped, substantially as herein shown and described, and for the purpose set forth.

DANIEL BROY.

Witnesses:
RICHARD WEST,
G. VAN WERDEN.